May 19, 1931. R. C. HOPKINS 1,806,462
GAS VALVE
Filed May 31, 1929

Inventor
Robert C. Hopkins
By Harry Frease
Attorney

Patented May 19, 1931

1,806,462

UNITED STATES PATENT OFFICE

ROBERT C. HOPKINS, OF ALLIANCE, OHIO

GAS VALVE

Application filed May 31, 1929. Serial No. 367,252.

The invention relates to valves for controlling the flow of air, gas, water, oil or other fluids.

The object of the improvement is to provide a spring pressed valve working with a pressure of the fluid; and to provide a valve formed of cork treated or impregnated with paraffin or oil to resist erosion and prevent corrosion of the valve, and leakage incident to high pressures.

Figure 1:
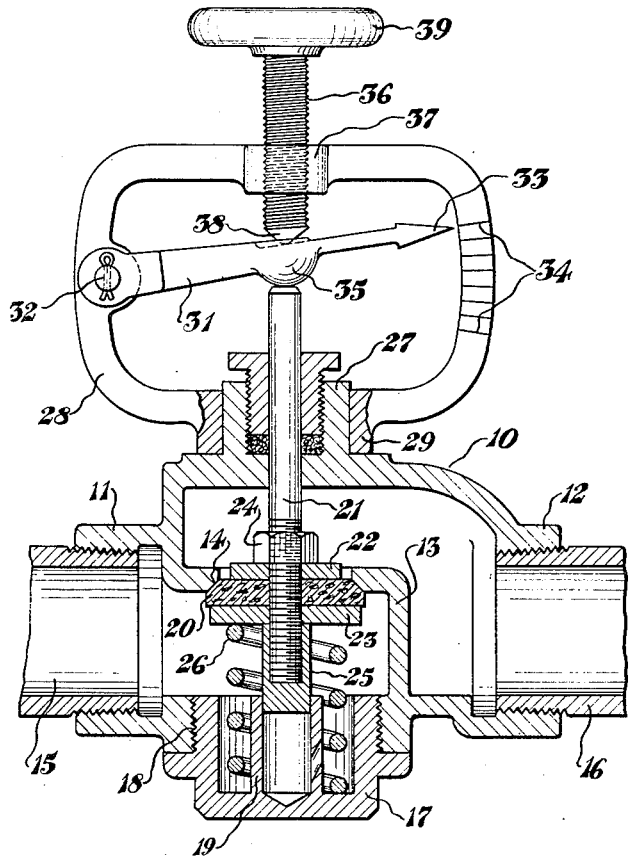
Figure 2:
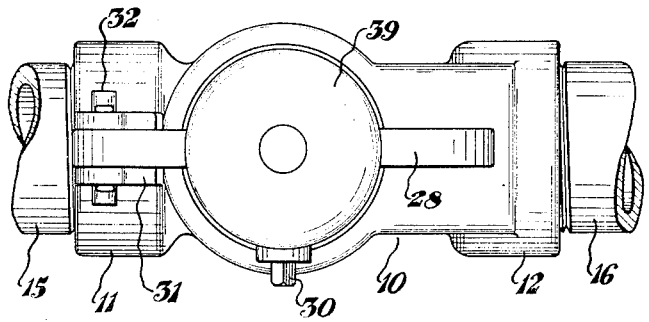

The above and other objects may be attained by constructing the valve in the manner illustrated in the accompanying drawings, in which Figure 1 is a longitudinal sectional view through the improved valve;

Fig. 2, a plan view of the same; and

Figure 3:
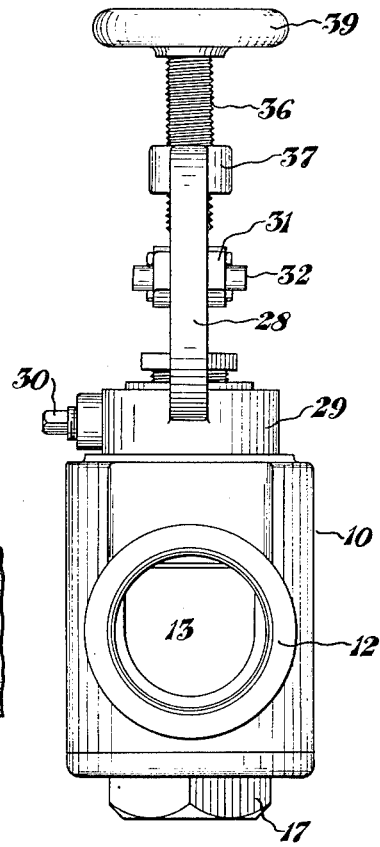

Fig. 3, an end view of the same.

Similar numerals refer to similar parts throughout the drawings.

The valve casing indicated generally at 10 may be in the form of a casting having the internally threaded inlet neck 11 and outlet neck 12 separated as by the partition wall 13 in which is located a valve seat 14 upon the inlet side thereof and preferably tapered, as shown in Fig. 1.

The inlet pipe 15 and outlet pipe 16 may be threaded into the inlet and outlet necks respectively for conveying fluid into and from the valve.

The thimble 17 is threaded into the tapped opening 18, in the lower portion of the valve casing and in alinement with the valve seat, and is provided with the concentric tubular portion 19. The valve 20 is preferably formed of cork treated with paraffin or oil and shaped to fit the valve seat 14.

This valve is mounted upon the threaded lower portion of the valve stem 21, between the bronze disks 22 and 23 which are clamped tightly against the cork valve as by the upper nut 24 and the lower cylindric nut 25 arranged to slide within the tubular portion 19 of the thimble 17. A coil spring 26 is located around the nut 25 and tubular portion 19 and tends to normally urge the valve toward the closed position shown in Fig. 1.

The valve stem is slidably mounted through the stuffing box 27 located upon the outlet or low pressure side of the valve casing. The indicator guard 28, which may be in the form of an eye as best shown in Fig. 1, is provided at its lower end with a ring 29 adapted to fit upon the stuffing box, a set screw 30 being carried thereby for attaching the guard to the valve casing.

It will be noted that with this construction the guard may be turned to any desired angle with reference to the valve casing.

The indicator arm 31 is pivoted, as at 32, upon one side of the indicator guard, the other end thereof being pointed as at 33 and arranged to cooperate with the graduations 34, upon the other side of the guard, to indicate the degree to which the valve is opened. The indicator arm is made of bendable material for a purpose stated later herein.

The intermediate portion of the indicator arm may be provided with the ball 35 adapted to contact with the upper end of the valve stem, and an adjusting screw 36 is threaded through the tapped boss 37 formed upon the top of the guard, and provided with the conical end 38 for engagement with the upper surface of the indicator arm, the hand wheel 39 or the like being fixed upon the upper end of the screw for operating the same.

It will be seen that the indicating arm will indicate correctly at all times. In order to indicate correctly, there must be no lost motion, and this is obviated by placing the indicator arm between the valve stem and the regulating screw.

The valve openings 14 of all valves in a single system are machined to exactly the same size and it therefore follows that if the valve is raised the same, there will be the same flow through the valve if the pressure is the same, that is, for a given degree on the indicator there is a positive and corresponding flow through the valve.

The adjustment of the indicator arm is simple. When the valve is seated it is only necessary to bend the indicator arm so that the arrow points to the last or upper graduation, indicating that the valve is fully closed.

If the valve should wear in the course of use, it is only necessary to close the same and again adjust the indicator arm in the manner above described, whereby it will be reset for the most accurate kind of flow and its corresponding indication.

It will be seen that the indicator guard can be revolved on the valve casing and fixed in any desired position without interfering with the action of the valve.

The valve closing with the pressure, or in the direction of flow of the fluid, will prevent any movement of the valve by the fluid since the regulating screw forms a positive stop for the valve stem and the spring urges the valve toward closing position at all times.

The cork valve obviates the necessity of fine grinding which is necessary when metallic valves and seats are in contact and the paraffin or oil treatment of the cork disk makes the same impervious to air, gas, water, oil or other fluids under high pressures.

I claim:

In combination with a valve casing having a seat thereon, a valve stem within the casing, and a valve for sealing against high pressures including a cork disk impregnated with paraffin upon the stem for engagement with the valve seat, and a metal disk fixed upon the stem on each side of the cork disk.

In testimony that I claim the above, I have hereunto subscribed my name.

ROBERT C. HOPKINS.